(12) United States Patent
Acuña et al.

(10) Patent No.: US 9,384,184 B2
(45) Date of Patent: Jul. 5, 2016

(54) PREDICTING A COMMAND IN A COMMAND LINE INTERFACE

(75) Inventors: Jorge D. Acuña, Vail, AZ (US);
Ezequiel Cervantes, Tucson, AZ (US);
Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 13/348,534

(22) Filed: Jan. 11, 2012

(65) Prior Publication Data
US 2013/0179460 A1  Jul. 11, 2013

(51) Int. Cl.
| G06F 17/30 | (2006.01) |
| G06F 17/27 | (2006.01) |
| G06F 9/44  | (2006.01) |

(52) U.S. Cl.
CPC ............... *G06F 17/276* (2013.01); *G06F 8/33* (2013.01)

(58) Field of Classification Search
CPC .......... G06F 17/30867; G06F 17/3087; G06F 17/30864; G06F 17/30067
USPC ........................................................ 707/758
See application file for complete search history.

(56) References Cited

U.S. PATENT DOCUMENTS

| 4,692,858 | A * | 9/1987 | Redford et al. ............... 715/744 |
| 5,867,700 | A * | 2/1999 | Ohkura et al. | |
| 6,018,342 | A * | 1/2000 | Bristor .......................... 715/840 |
| 6,922,810 | B1 * | 7/2005 | Trower, II ............. G06F 3/0237 704/1 |
| 8,600,973 | B1 * | 12/2013 | Popovici et al. ............... 707/708 |
| 8,762,363 | B1 * | 6/2014 | Koo et al. ....................... 707/706 |
| 2004/0041833 | A1 * | 3/2004 | Dikhit ..................... H04L 41/12 715/738 |
| 2004/0117380 | A1 * | 6/2004 | Perrow .......................... 707/100 |
| 2004/0249849 | A1 * | 12/2004 | Mordkovich .................. 707/102 |
| 2005/0010867 | A1 * | 1/2005 | Igata et al. ..................... 715/513 |
| 2009/0172541 | A1 | 7/2009 | Acedo et al. |
| 2010/0287499 | A1 * | 11/2010 | Zhang ........................... 715/808 |
| 2012/0150939 | A1 * | 6/2012 | Zaifman ............. G06F 9/45512 709/203 |
| 2012/0192096 | A1 * | 7/2012 | Bowman et al. .............. 715/780 |

OTHER PUBLICATIONS

Brian D. Davison et al. "Toward an Adaptive Command Line Interface", Design of Computing Systems: Cognitive Considerations. Proceedings of the Seventh International Conference on Human-Computer Interaction (HCI International '97), 505-8 vol. 2, 1997.

* cited by examiner

*Primary Examiner* — Cam-y Truong
(74) *Attorney, Agent, or Firm* — Kunzler Law Group

(57) ABSTRACT

An apparatus for predicting a command in a command line interface includes a template command module, a parameter derivation module, and a parameter substitution module. The template command module is configured to determine a template command based on a command line history. The template command includes a command name and a parameter and the command line history includes two or more previously entered commands. The parameter derivation module is configured to determine a parameter derivation rule for deriving the parameter in the template command based on the command line history. The parameter substitution module is configured to substitute a substitute parameter for the parameter of the template command according to the parameter derivation rule.

15 Claims, 7 Drawing Sheets

```
       $ smcli mknsvol -n SUBES24
       storageID=CB6A18A813B5375C975145AE8799E2F7
       volumeName=DEV_1 ←――――――― 608
600 ⎰  volumeID=600A0B8000175C5B000003134DC7B443
       controllerIDList=[600A0B800017BEC8000000004B4B8052_1T45100512]
604 →  $ smcli mknspath -n svs128 -A nssys=SUBES24,nsvol=DEV_1

606 →  $ smcli mknsvol -n SUBES24
       storageID=CB6A18A813B5375C975145AE8799E2F8
       volumeName=DEV_2 ←――――――― 610
       volumeID=600A0B8000175C5B000003134DC7B444
       controllerIDList=[600A0B800017BEC8000000004B4B8052_1T45100513]

602 →  $ smcli mknspath -n svs128 -A nssys=SUBES24,nsvol=DEV_2
```

300

1. $ nameA
2. $ nameB paramW
3. $ nameE paramW
4. $ nameA
5. $ nameB paramX
6. $ nameC paramX
7. $ nameB paramX
8. $ nameD paramX
9. $ nameA
10. $ nameB paramY
11. $ nameC paramY
12. $ nameA
13. $ nameB paramZ

404 → $ smcli mknsvol -n SUBES24 storageID=CB6A18A813B5375C975145AE8799E2F7

406 → volumeName=DEV_1 volumeID=600A0B8000175C5B000003134DC7B443 controllerIDList=[600A0B800017BEC8000000004B4B8052_1T45100512]

402 → $ smcli mknspath -n svs128 -A nssys=SUBES24,nsvol=DEV_1

FIG. 4

500 cmdOffset = 1
lineOffset = 2
begDelimiter = '='
endDelimiter = 'new line'

FIG. 5

600 {
.
.
.
$ smcli mknsvol -n SUBES24 storageID=CB6A18A813B5375C975145AE8799E2F7 volumeName=DEV_1 ⟵ 608 volumeID=600A0B8000175C5B000003134DC7B443 controllerIDList=[600A0B800017BEC8000000004B4B8052_1T45100512]

604 ⟶ $ smcli mknspath -n svs128 -A nssys=SUBES24,nsvol=DEV_1
.
.
.
606 ⟶ $ smcli mknsvol -n SUBES24 storageID=CB6A18A813B5375C975145AE8799E2F8 volumeName=DEV_2 ⟵ 610 volumeID=600A0B8000175C5B000003134DC7B444 controllerIDList=[600A0B800017BEC8000000004B4B8052_1T45100513]

602 ⟶ $ *smcli mknspath -n svs128 -A nssys=SUBES24,nsvol=DEV_2*

FIG. 6

700

702 — Determine a template command

704 — Determine a parameter derivation rule for deriving a parameter in the template command 706 — Substitute a substitute parameter into the template according to the parameter derivation rule

FIG. 7

800

802 — Locate a parameter value within the template command

804 — Search a command line history for a match with the parameter value

806 — Record a rule defining the location of the match with respect to the location of the template command

FIG. 8

PREDICTING A COMMAND IN A COMMAND LINE INTERFACE

BACKGROUND

1. Field

The subject matter disclosed herein relates to computing devices and systems and more particularly relates to command line interfaces.

2. Description of the Related Art

A command line interface (CLI) provides a method of interacting with a device or software by allowing a user to enter commands into a text terminal, a terminal emulator, or remote shell client. The commands are processed by a command line interpreter which initiates operations that correspond to the entered command. A relatively simple CLI usually displays a prompt to accept a command that is typed by a user and terminated by an enter key. A typical command includes a command name, which designates the type of operation to be performed and a parameter, which may be data, a file, a device or an object on which the operation should be performed. One or more switches flags, or other entries may also be included to modify or control how the operation is executed.

A command should be entered according to the rules of the CLI that processes a command. A CLI can generally be considered as consisting of syntax and semantics. The syntax is the grammar that all commands must follow while the semantics control what operations can be performed and the type of data on which operations can be performed. A CLI is typically used when a large vocabulary of commands or queries, coupled with a wide range of options, can be entered more rapidly as text than with a pure graphical user interface (GUI). CLIs are often used by programmers, system administrators, and technically advanced personal computer users.

Unlike a button or menu item in a GUI, a command line is typically self-documenting, recording exactly what was entered and the results of an entry. For example if a command is entered the CLI may display the output of the command below the command. As more and more text from commands and outputs of commands are generated, the CLI may scroll the text upwards to keep a current command prompt or output in view. Many CLIs will keep the previously entered text of commands and outputs of command visible as long as a session remains open. This can serve as a reference for a user as to what has occurred previously.

BRIEF SUMMARY

An apparatus for predicting a command in a command line interface is disclosed. In one embodiment, the apparatus includes a template command module, a parameter derivation module, and a parameter substitution module. In one embodiment, the template command module is configured to determine a template command based on a command line history. The template command may include a command name and a parameter and the command line history may include two or more previously entered commands. In one embodiment, the parameter derivation module is configured to determine a parameter derivation rule for deriving the parameter in the template command based on the command line history. In one embodiment, the parameter substitution module is configured to substitute a substitute parameter for the parameter of the template command according to the parameter derivation rule.

A computer program product for predicting a command in a command line interface is also disclosed. In one embodiment, the computer program product may be configured to determine a template command based on a command line history. The template command may include a command name and a parameter and the command line history may include two or more previously entered commands. In one embodiment, the computer program product may be configured to determine a parameter derivation rule for deriving the parameter in the template command based on the command line history. In one embodiment, the computer program product may be configured to substitute a substitute parameter for the parameter of the template command according to the parameter derivation rule.

A system for predicting a command in a command line interface is also disclosed. In one embodiment, the system includes a command line interpreter, a template command module, a parameter derivation module, and a parameter substitution module.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 illustrates one embodiment of a command line history 300 that includes abstract versions of previously entered commands in accordance with the present invention;

FIG. 4 illustrates one embodiment of a portion of a command line history that includes command outputs in accordance with the present invention;

FIG. 5 illustrates one embodiment of a parameter derivation rule in accordance with the present invention;

FIG. 6 illustrates one embodiment of predicted next command that is based on previously entered commands in accordance with the present invention;

FIG. 7 is a schematic flow chart diagram illustrating one embodiment of a method for predicting a next command in a command line interface in accordance with the present invention;

FIG. 8 is a schematic flow chart diagram illustrating one embodiment of a method for determining a parameter derivation rule in accordance with the present invention;

DETAILED DESCRIPTION

Figure 1:
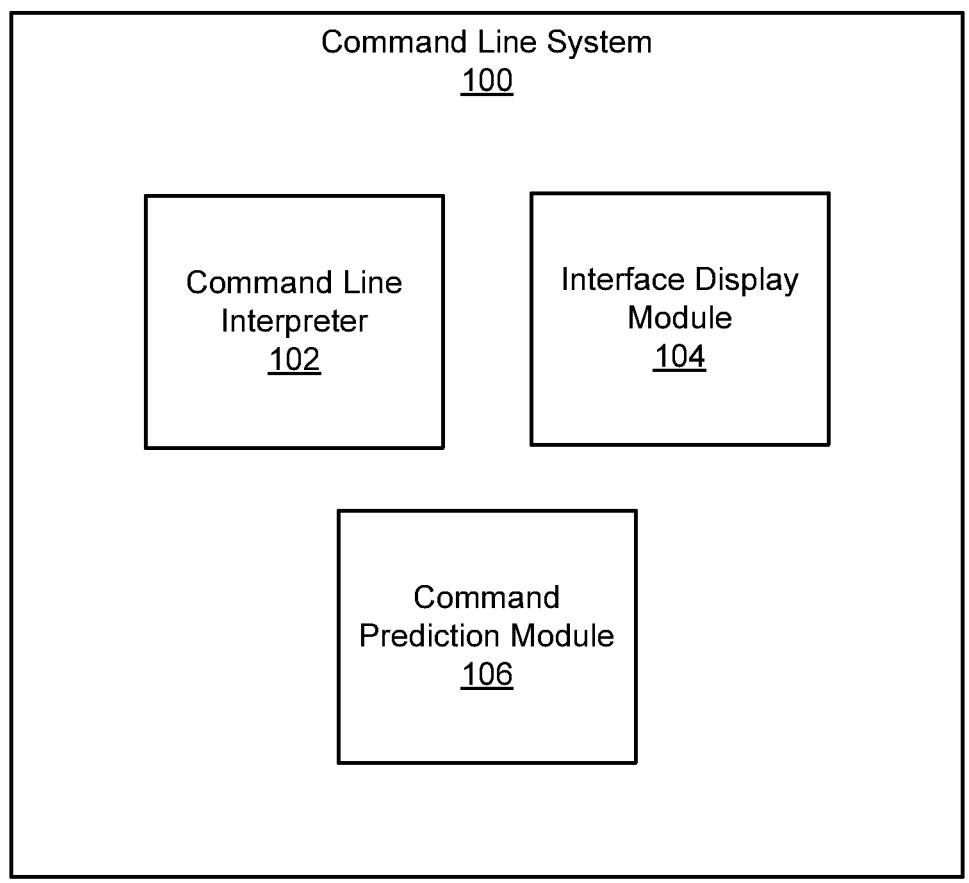
FIG. 1 is a schematic block diagram illustrating one embodiment of a command line system in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a command line system 100. In one embodiment, the command line system 100 provides a command line interface (CLI) which includes functionality for predicting future command line entries. The command line system 100 may also provide any other conventional command line functionality known in the art. In one embodiment, the command line system 100 includes a command line interpreter 102, an interface display module 104, and a command prediction module 106.

According to one embodiment, a command line system 100 includes a command line interpreter 102. The command line interpreter 102 may receive a command line and initiate a corresponding operation. According to one embodiment, the command line interpreter 102 is a conventional command line interpreter found in a variety of command line systems.

In one embodiment, the command line interpreter 102 has a defined syntax and set of semantics which each command line must follow in order to be understood by the interpreter. In one embodiment, for example, a command line may be required to include a command name. If one or more switches, flags or parameters are desired for the command, they may have a required order or location within the command to be properly interpreted. Flags and switches may be required to be preceded by a particular character, such as a '–' in some embodiments, to be correctly interpreted. In one embodiment, a parameter must be preceded by a label in order to designate the parameter properly.

In one embodiment, the command line interpreter 102 parses text that has been entered at a prompt within the CLI into its separate parts. For example, it may parse text which has been entered at a prompt into separate components which may include one or more of a command name, a switch, a flag, a parameter, or any other part of a command. The command line interpreter may then interpret how each part affects the execution of a command an initiate operations corresponding to that command. If the entered command has the proper syntax and semantics the command may execute and one or more lines of output, if any, may be displayed. In one embodiment, if the text is entered having incorrect semantics or syntax, the command line interpreter may return an error message.

In one embodiment, the command line system 100 includes an interface display module 104. The interface display module 104 may perform operations to provide the CLI to a user. In one embodiment, the CLI may be provided on an output device such as a display screen. Other embodiments may provide the CLI on any type of output device known in the art. In embodiments using display screens, the interface display module 104 may display a command prompt, commands entered at the command prompt, and output of commands. The interface display module 104 may display text and/or graphical elements. In one embodiment, as commands are entered and executed the interface display module 104 scrolls the window to keep a most recent input, output or command prompt in view.

In one embodiment, the command line system 100 may include a command prediction module 106. In one embodiment, the command prediction module 106 predicts a command to be executed in a CLI. In one embodiment, the predicted command is based on a history of previous commands and outputs of the CLI. Exemplary operation of the command prediction module 106 will be discussed in relation to the remaining figures.

Figure 2:
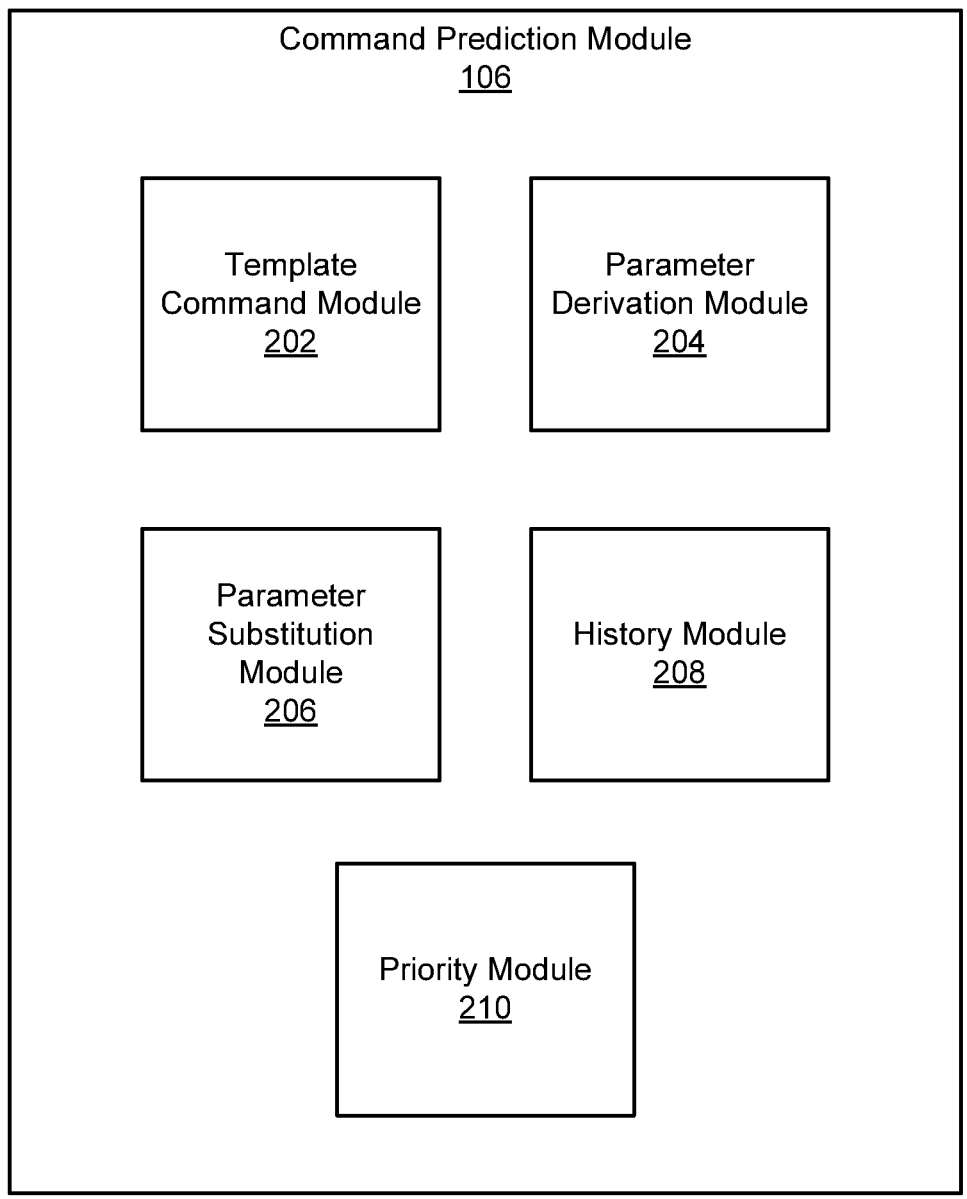
FIG. 2 is a schematic block diagram illustrating one embodiment of a command prediction module in accordance with the present invention.

FIG. 2 is a schematic drawing illustrating one embodiment of a command prediction module. In the depicted embodiment, the command prediction module 106 includes a template command module 202, a parameter substitution module 206, a parameter derivation module 204, a history module 208, and a priority module 210. The modules 202-210 are exemplary only and are not all included in all embodiments. For example, one embodiment may include only the template command module 202 and the parameter substitution module 206. Other embodiments may include one or more of any of the modules 202-210 in any combination.

The command prediction module 106 may include a template command module 202. In one embodiment, the template command module 202 determines a template command. The template command module 202 may determine a template command based on a command line history of a CLI. In one embodiment, the template command module 202 may search a command line history using one or more rules or algorithms to identify one or more commands to serve as template commands.

In one embodiment, the command prediction module 106 searches for a sequence that matches a current sequence and designates a command immediately following the matching sequence as a template command. A current sequence may include one or more of the most recently entered commands. In one embodiment, the current sequence may have a length of one or more commands. In one embodiment, the history is searched for commands that match the current sequence. For example, if the current sequence is of length one the command line history may be searched for all instances of commands that match the most recent command. For each match, the command following the match may be designated as a template command.

In one embodiment, the current sequence may include a sequence length of greater than one. For example, if the current sequence is of length two the command line history might be searched for consecutive commands that match the two most recent commands and are in the same order. Each set of earlier commands that match the commands of the current sequence and have the same order may be matching sequences. Commands following each matching sequence may be used as a template command. Similar operations may be used in relation to current sequences having any length.

In one embodiment, when the template command module 202 searches for a matching sequence it may only search for matches based on a sub portion of a command. For example, the template command module 202 may only search for command names and ignore parameters, switches, and flags in both commands of the current sequence and commands in the command line history. Thus, a matching sequence may be a match for the command names of a current sequence independent of whether one or more flags, switches, or parameters are the same. In one embodiment, the search is based on a command name and one or more of any flags, any switches, and any parameters. For example, a matching sequence may be a match for the current sequence when it includes the same command name and flags.

In one embodiment, a search for a current sequence may return more than one template command. For example, a search may result in more than one matching sequence. In one embodiment, each command following the more than one matching sequences may be designated as a template command. In one embodiment, the template command module 202 may search for current sequences having a first length and current sequences having a second length. In one embodiment, the template command module 202 may search for matches for a current sequence having a first length which results in locating one or more template commands and then searching for matches for current sequences having a second command length which results in locating one or more template commands.

In one embodiment, the template command module 202 may perform search for matches for current sequences having a maximum sequence length and then perform consecutive searches with a current sequence shortened by one for each consecutive search. For example, if a maximum sequence length were five, the template command module 202 may perform a series of searching for current sequences having lengths of five, four, three, two, and one. In one embodiment, the template command module 202 may begin by performing a search for a current sequence having length one and increasing the current sequence length until the maximum sequence length is reached. For example, if a maximum sequence length were five, the template command module 202 may perform a series of searching for current sequences having lengths of one, two, three, four, and five.

A maximum sequence length may vary between embodiments and may be a value configurable by a user. Various considerations may be taken into account when setting a maximum sequence length, such as quality of matches, likelihood of finding matches of a current length, and the use of computing resources. For example, larger maximum sequence lengths may locate template modules that better predict a next match but may also take more computing resources for performing a search. Alternately, larger sequence lengths may be so long that generally no matches are found anyway. Thus, efficiency may point to a smaller maximum sequence length while better predictive abilities may lead to a larger maximum sequence length.

The methods for searching for a command in a history to serve as a template command are exemplary only. According to varying embodiments, other methods, algorithms, and/or rules may be used to locate a command in the command line history to serve as a template command. For example, algorithms based on how recently a command was entered, how often a specific command or sequence of commands appears in a history, and or any other algorithms and rules. In one embodiment, various algorithms and/or rules may be combined within a single method or algorithm for searching for a command to serve as a template command. In one embodiment, the methods, algorithms, and/or rules used may be based on providing the highest likelihood that a predicted command will be the next entered command. The algorithm that is used may depend on the type of CLI as well as the environment in which the CLI is used.

Turning now to FIG. 3, exemplary algorithms and rules for searching for template commands will be illustrated. FIG. 3 illustrates one embodiment of a command line history 300 that includes previously entered commands. The command line history 300 is depicted having commands 1-13 which represent commands that were previously entered in the CLI. According to one embodiment, only commands that had proper syntax and semantics are listed in the command line history 300. The commands 1-13 are illustrated having abstract command names ('nameA', 'nameB', etc) and parameters ('paramW, paramX, etc.) for simplicity of discussion. Although a command line history may include the outputs of commands they are not illustrated in the command line history 300 of FIG. 3. At least one embodiment of a history 300 includes the outputs of commands.

Although the command line history 300 is shown with only thirteen commands it will be clear to one of skill in the art that the command line history length may be varied to any desired length. For example, some embodiments may include command histories which include hundreds or thousands of commands.

In one embodiment, each of the commands 1-13 represent previously entered commands and the order that they were entered or executed. For example, command 1 may be a command that was entered before any other command in the command line history. That is, command 1 may be described as the oldest command. On the other hand, command 13 may be a command that was entered after any other command in the command line history 300. In one embodiment, command 13 is the most recent command that was entered or executed in a CLI that corresponds to the command line history 300. In one embodiment, for example, no other commands may have been entered since command 13.

According to one embodiment, determining a template command may include determining the current sequence. In one embodiment, a current sequence may be determined using the most recent commands in the command line history 300. In another embodiment, commands corresponding to a current sequence are stored separately from the command line history. In one embodiment, the current sequence includes at least the most recent command and may include two or more of the most recent commands in the command line history 300. For example, if the current sequence had a length of one command, the current sequence would include command 13 'nameB paramZ.' In one embodiment, 'nameB' represents a command name which controls, at least in part, what operation or program would be initiated based on a command. In one embodiment, 'paramZ' represents a file, device, or other object on which, or in relation to which, the operation will be performed.

In one embodiment, the command line history is searched for a complete command that matches the command(s) of the current sequence, in this case 'nameB paramZ.' However, because the command line history does not include any identical command, no matches may be located. In one embodiment, rather than searching for the full command, the command line history 300 is searched for the command name only, or for some other sub portion of the command. In this case, searching for the command name 'nameB' only locates matches at commands 2, 5, 7, and 10 because each of these includes the text 'nameB.'

In one embodiment, commands following each matching sequence may be designated as template commands. For example, the command following command 2 is 'nameE paramW', the command following command 5 is 'nameC paramX', the command following command 7 is 'nameD paramX', and the command following command 10 is 'nameC paramY'. The one or more template commands indentified by the template command module 202 may then be used by one or more of the other modules to create a predicted command.

In one embodiment, another search using a current sequence having a different length may be used. In one embodiment, the current sequence length may be iteratively lengthened and searched for in the command line history 300 until a maximum allowed current sequence length is reached. Other embodiments may begin at the maximum length and iteratively shorten and search for the current sequence until a length of 1 is reached.

In one embodiment, the command line history 300 may be searched for a current sequence having a length of two commands. In the depicted history, this would include commands 13 and 12. Based on a current sequence of length two the command line history 300 may be searched for a series of commands that include 'nameA' and 'nameB' in that order. This may return the command series 1 and 2 [1, 2], the command series [4, 5], and the command series [9, 10]. The commands following these series, commands 3, 6, and 11, may then be designated as template commands.

The command line history 300 may be searched for a current sequence having a length of three commands. Based on a current sequence of length three the command line history 300 may be searched for a series of commands that include 'nameC', 'nameA' and 'nameB' in that order because these are the command names of the three most recent commands, commands 11-13. However, there are no matches in the exemplary search history 300.

In one embodiment, a maximum current sequence length may be three and no searches for sequences longer than a length of three may be used. As will be understood by one of skill in the art, a maximum current sequence length may be any desirable length. Considerations that affect the maximum length may include computing efficiency, the sequence length of common repetitive sequences, or any other considerations.

Returning now to FIG. 2, the prediction module 106 may include a parameter derivation module 204. The parameter derivation module 204 may determine a parameter derivation rule for deriving a parameter in one or more template commands. In one embodiment, the parameter derivation module 204 determines a parameter derivation rule for deriving a parameter of one or more template commands determined by the template command module 202. In one embodiment, if a template command does not include a parameter no parameter derivation rule will be determined. In one embodiment, if a template command does not include a parameter the template command may be provided as a predicted next command without any modification of the template command.

In one embodiment, a parameter derivation rule may be determined based on information in a command line history 300 that is prior to the location of a template command in the command line history 300. For example, the contents of a command line history 300 prior to a command used as a template command, including both previous commands and outputs of previous command, may be searched for text or data corresponding to the relevant parameter. In one embodiment, a parameter derivation rule based on information prior to the location of a command is useful because it may be used in predicting a predicted next command, when only information prior to the next command is available.

In one embodiment, if text or data matching a parameter of a template command is located in the command line history the parameter derivation module 204 may determine a parameter derivation rule regarding how to locate the data. In one embodiment, the parameter derivation rule may include the location of the matching text or data with respect to the corresponding template command. For example, if text or data corresponding to the parameter is found within a previous command, the parameter derivation rule may include a command offset value of one, indicating that the parameter was found within the immediately preceding command.

A parameter derivation rule may also include one or more delimiter character(s), column numbers, or other information to indicate where within the preceding command the parameter was found. For example, if a matching parameter value was preceded by a command name and a space character and was followed by a space character, the parameter derivation rule may include a space character as a preceding delimiter and a space character as a following delimiter. This may allow the text or data to be derived by reading the text or values between the preceding and following delimiter characters.

Exemplary information that may be included in a parameter derivation rule for deriving a command parameter include a command offset value, a line offset value, one or more sets of delimiter characters, column numbers, or any other information. Additionally, the parameter derivation rule may also include flexible location data. For example, the parameter derivation rule may indicate that the nearest command having a certain command name should be located and a text or value within that command or an output of that command should be read or copied. According to one embodiment, if text or data is located that matches the parameter is found in more than one location, more than one parameter derivation rule may be derived.

Turning back to FIG. 3 exemplary derivation of a parameter will be illustrated. According to our exemplary derivation scenario command 11 'nameC paramY' has already been determined to serve as a template command. For example, the template command module 202 may have determined command 11 to serve as a template command based on one or more of the methods and principles discussed above. The parameter derivation module 204 may then use the information in the command line history 300 prior to command 11 to determine a parameter derivation rule for deriving a parameter of command 11.

In one embodiment, determining a new parameter derivation rule may include locating a parameter within command 11 and searching for text or data corresponding to that parameter. In one embodiment, the command may be parsed according to the grammar of the specific command line environment. In one embodiment, a command line interpreter may be used to parse the command into its command name and parameter(s) according to a command line environment's grammar. In one embodiment, a CLI may include help information that defines grammar and/or semantics for each command name. In one embodiment, the parameter derivation module may look up the command name 'nameC' of command 11 in the help information. Based on the help information the parameter derivation module 204 may be able to determine what portions of command 11 are parameters. In one embodiment, the method would lead to determining that 'paramY' is a parameter in command 11. The information in history 300 may then be searched for 'paramY'

In one embodiment, determining a new parameter derivation rule for deriving a parameter may include parsing a template command into separate parts and searching for each part in the command line history 300. For example, command 11 may be parsed into two parts 'nameC' and 'paramY'. Then 'nameC' and 'paramY' may then be searched for in the command line history 300. In one embodiment, all parts of a command are searched for except for the command name. In such a case, no search would be performed for 'nameC' because it is command name but a search for 'paramY' would still be performed. If there were additional parts of a command they may also be searched for as well.

The command line history 300 may be searched for a parameter. In one embodiment a history may be searched for a match. In one embodiment, only previous commands and/or outputs of commands within a matching sequence length will be searched. For example, if a sequence length of three is matched only the outputs of the three commands of the matching sequence would be searched. In one embodiment, only previous commands and/or outputs of commands within a defined proximity will be searched. In one embodiment, this proximity may be based on a maximum sequence length. For example, if a maximum sequence length is five, only the commands and outputs of commands within five commands may be searched for a match. This may save memory and resources from being used to perform searches of a large history. This may also allow for better matches because it may be that any matches outside of a certain proximity would be poor matches. In one embodiment, the maximum sequence length for searching may be the same as the maximum sequence length for the current sequence. Alternatively, the two maximum lengths may be independently adjustable.

In the current scenario, a search for 'paramY' would return a match in command 10 because it includes the exact same text or data 'paramY'. Based on this match, the parameter derivation module 204 may then create a parameter derivation rule describing the location of the matching text or data in relation to the template command, in this case, command 11. A parameter derivation rule may also be created describing the location of the parameter 'paramZ' within command 11.

In one embodiment, a parameter derivation rule describing the location of the match in relation to the original parameter may include one or more offset values. For example, the matching 'paramY' of command 10 is in the command previous to command 11, the command serving as a template command. The parameter derivation rule for deriving the parameter of command 11 may thus include a previous command offset of one or negative one. This may indicate that the parameter should be looked for in the previous command. Other parameter derivation rules may include offsets of any other value. In one embodiment, the parameter derivation rule may include information relating to a most recent command of a certain type. For example, another way of describing the location of command 10 in relation to command 11 is as the most recent previous command using the command name 'nameB'. One of skill in the art will recognize numerous other ways of describing the location of command 10 in relation to command 11.

The parameter derivation rule may also include information defining where within a command or output the parameter match is found. For example, the location of 'paramY' in command 11 may be described in relation to a delimiter character, such as the space preceding 'paramY', the end of the command line, a column offset or any other value. In one embodiment, the overall parameter derivation rule for deriving 'paramY' of command 11 includes a command offset of one, and location information that indicates all text after a space delimiter character to the end of the command line. In one embodiment, the overall parameter derivation rule for deriving the parameter may include information that the match is found in the most recent command using the command name 'nameB' with the parameter text including all text following the first space character. One of skill in the art will recognize numerous types of information or configuration of parameter derivation rules to describe a location of a match with a parameter of interest.

Although the match for 'paramY' was found in a previous command, it should be understood that outputs of previous commands may also be searched for matches and that parameter derivation rules corresponding to such matches may be created. In such an embodiment, the location of a match within an output may include a command offset, a line offset within the output of the command, column offsets, delimiter values or characters, or any other information describing the location of the match in the command line history. One of skill in the art will recognize that there is considerable possible variation within the scope of the present disclosure.

Turning now to FIG. 4, exemplary derivation of a parameter based on information in a command output will be illustrated. FIG. 4 depicts a portion of an exemplary command line history 400 that includes a template command 402. In one embodiment, the template command 402 may have been determined by the template command module 202.

According to one embodiment, the parameter derivation module 204 will be used to derive a parameter derivation rule for the parameter text 'DEV_1', depicted in bold, of the template command. The command line history 400 may be searched for the text 'DEV_1' and which may be located in the output of the previous command 404. The parameter match 408 is located in a second line 406 of output.

Based on the finding of the parameter match 408 the parameter derivation module 204 may determine a parameter derivation rule for deriving the parameter text 'DEV_1'. One exemplary command derivation rule may include a command offset of 1, an output offset of two lines, and a beginning delimiter '=' character with an ending delimiter 'new line' character. Another command derivation rule may include instructions to locate the most recent previous command that uses the command name 'smcli mknsvol', a beginning delimiter of 'volumeName=' and an ending delimiter 'new line' character. In one embodiment, this parameter derivation rule may be stored for later usage.

In some embodiments a command prediction module 106 may not include a parameter derivation module 204. In one embodiment, the parameter derivation module 204 may be included in a separate module, device, or apparatus. In one embodiment, the parameter derivation rules for substitution may be stored in lookup table or some other location.

FIG. 5 depicts an exemplary embodiment of a parameter derivation rule 500 for deriving the parameter of the template command 402. In the depicted embodiment, the parameter derivation rule 500 includes text for defining the location of a matching parameter in relation to a template command. In one embodiment, the rule is to be used in relation to a reference point, such as a template command location or a command prompt where a predicted next command may be provided.

According to one embodiment, cmdOffset=1 may be interpreted to mean that a command immediately preceding a reference location should be examined. For example, cmdOffset=2 may indicate that a command preceding a reference location by two commands should be examined. According to one embodiment, lineOffset=2 may be interpreted to mean that a line two lines down from the examined command (indicated by cmdOffset=1) should be examined. For example lineOffset=2 may mean that a second line in an output of a command would be examined while lineOffset=2 may indicate that the command itself should be examined. According to one embodiment, begDelimiter='=' may indicate that, within the location indicated by the cmdOffset and lineOffset values, an equals character should be located and defines the character just before the location of the desired parameter value. According to one embodiment, endDelimiter='new line' may indicate that, within the location indicated by the cmdOffset and lineOffset values, a new line or return character should be located and should be used to define the character just following the location of the desired parameter value. For example, applying the parameter derivation rule 500 to the portion of history 400 of FIG. 4 with the command template 402 used as a reference would return the value 'DEV_1'.

One of skill in the art will recognize that there are numerous ways for defining the location of matching text or data in relation to a location of a parameter of a template command.

In one embodiment, there are two ways to understand the meaning of a parameter derivation rule 500. For example, one way to understand the parameter derivation rule 500 is that it records the location of text or data in relation to a template command that matches a parameter of a template command. Another way to understand the parameter derivation rule 500 is as instructions for where to look for text or data, in relation to a next command, in order to make a substitution of a parameter into a template command. For example, the parameter derivation module 204 may derive the rule based on the relationship between text or data and a parameter in a template command while a parameter substitution module 206 may interpret the rule for finding text or data for use in a next command.

Returning to FIG. 2, a command prediction module 106 may include a parameter substitution module 206. The parameter substitution module 206 may substitute a parameter of a template command based on one or more parameter derivation rules. The parameter derivation rule may be a rule that includes information about how to derive a parameter from previous commands and outputs of a CLI. The parameter derivation rule may be a rule derived by a parameter derivation module 204, a rule stored in a look up table or file, or have any other source or any other location.

Using information in a parameter derivation rule, the parameter substitution module 206 may substitute a parameter of a template command with text or data in a previous command or output. For example, using a parameter derivation rule the substitution module may copy text or data from a previous location and substitute it as a parameter in a template command. The substitution may be a step in forming a predicted next command.

Turning to FIG. 6 an exemplary substitution based on the parameter derivation rule 500 of FIG. 5 will be illustrated. FIG. 6 depicts one embodiment of a portion of a command line history 600 and a current prompt 602. The current prompt 602 illustrates a predicted next command in italics to differentiate from other text that has already been entered or output. According to one embodiment, the predicted next command shown at the current prompt 602 is subject to selection an approval by a user.

The command line history 600 in conjunction with the parameter derivation rule 500 can be used to illustrate how the predicted next command shown at the current prompt 602 may have been determined. In one embodiment, a template command 604 may have been determined by a template command module 202 based on a most recent command 606. Parameter text 'DEV_1' may have been identified as a parameter by a parameter derivation module 204. A search for the parameter text 'DEV_1' may have been performed and resulted in locating a parameter match 608 at the location illustrated. The parameter derivation module 204 may have created a parameter derivation rule 500 (of FIG. 5) describing the location of the parameter match 608 in relation to the template command 604.

The predicted next command as shown at the current prompt 602 may have been created by substituting a value into the template command 604 based on the parameter derivation rule 500. Specifically, using the current prompt 602 as a beginning point a parameter substitution module 206 may have located the substitute parameter 610 'DEV_2' and substituted it in for the parameter 'DEV_1' of template command 604. In the depicted embodiment, the resulting predicted next command shown at the current prompt 602 is identical to the template command 604 except that the text 'DEV_2' has been substituted in for 'DEV_1'.

It is important to note that the predicted next command shown at the current prompt 602 may be unique from any command in the command line history 600. Although a command created through this substitution may not always be unique this illustrates that the command prediction module 106 may be able to create completely unique next commands and is not dependent on wholesale copying of previously used commands.

According to one embodiment, after substituting a parameter based on a parameter derivation rule one or more modifications or analysis of the new command will be performed. According to one embodiment, the new command will be checked to see if it meets command line syntax and or semantics requirements. If there are any problems, the new command may be modified to meet these requirements.

In one embodiment, the parameter substitution module 206 may substitute more than one parameter based on one or more parameter derivation rules. For example, if a template command includes multiple parameters, a substitution for each parameter may be performed. The template command 604 includes a parameter 'SUBES24' which may also be substituted, in one embodiment. Additionally, command flags or switches may also be modified or substituted. For example, the template command 604 includes a switch '-n' and a switch '-A' which may be modified or substituted, in some embodiments. In one embodiment, the flags and switches of a template command may be used without change. In one embodiment, the flags and switches of a template command may be modified to reflect the flags and switches used recently in relation to a command name included in the template command. For example, the most recent use of the command name may be used to determine what flags and/or switches will be used in a predicted next command.

In one embodiment, the parameter substitution module 206 may perform similar operations on a plurality of template commands. For example, if a template command module 202 has determined a plurality of template commands, the parameter substitution module 206 may perform parameter substations for each template command, when relevant.

Returning to FIG. 2, the command prediction module 106 may include a history module 208. According to one embodiment the history module 208 may maintain and/or store a command line history. The command line history may be updated to include each command and/or the output of each command in a CLI. In one embodiment, a command line history may be updated after each command is entered or executed. In one embodiment, a command line history may be updated after each session of use of a CLI In one embodiment, the command line history maintained by the history module 208 may include the literal text and date entered and/or displayed by a CLI. For example, a CLI it will often self document its actions. Text entered by the user is displayed at a prompt and output of a command is output on lines. As more and more text is input or output, a window or interface may scroll the text to keep the most current information in view. In one embodiment, the command line history may include exactly the same information as is displayed by an interface module and store it in a memory device.

In one embodiment, the command line history maintained by the history module 208 may include one or more abstract values. For example, rather than storing a literal value as entered and/or output the command line history the history module 208 may store an abstract value, such as an abstract value corresponding to a command name, a flag, a switch, or a parameter. In one embodiment, abstract values may be smaller than literal text and/or graphical information displayed by a CLI and may be used to limit the amount of memory used by a history.

In one embodiment, the parameter derivation rules may be stored in the command line history. For example, a real time analysis of the command line history may be performed to create parameter derivation rules. For example, as the history module 208 updates a history, the parameter derivation module 204 may perform an analysis to derive parameter derivation rules for each parameter in each command. The parameter derivation rules may then be substituted into the location of corresponding parameters. This may limit the size of the command line history and may reduce the amount of processing that occurs because a system may not be required to repeatedly derive the same parameter derivation rule for the same parameter over and over. In one embodiment, by deriving parameters in real time a history may not be required to store output data and may be able to simply store commands with parameter derivation rules substituted in for parameters.

The command line history stored by the history module 208 may vary considerably in size. The command line history may include tens, hundreds, thousands or even millions of commands. Considerations may need to be made for memory and resource usage for large command histories. However, histories that are too small may not store enough information to make good command predictions. In one embodiment, a user may be able to modify a value that controls the amount of commands stored. This may allow a user to modify the size of a history based on the user's needs, available computing resources, or any other consideration. In one embodiment, if a maximum history sized is reached and a new command is entered an oldest command in the history may be deleted to make room in the history for the new command.

As with other modules, the history module 208 may not be included in the command prediction module 106. For example, the history module may be located in a separate module, device, or system. In one embodiment, a history may be maintained separately from the command prediction module 106 and/or a CLI 100.

The command prediction module 106 may include a priority module 210. The priority module 210 may prioritize one or more predicted next commands that are created by the command prediction module 106. For example, each of the other modules 202-208 may operate on a plurality of template commands and or predicted next commands. The priority module 210 may prioritize the predicted next commands to reflect which commands are most likely to be used as a next command and present them to a user accordingly. For example, a predicted next command with a highest priority may be presented to a user first, while predicted next commands with decreasing priority are provided in a descending order.

In one embodiment, each time a command is executed a current prompt shows a highest priority predicted next command. The predicted next command may be shown with a different color, font, or other display characteristic to make clear to a user that it is a predicted next command and not an actually entered command. In one embodiment, a user may be able to cycle through a plurality of predicted next commands using a keyboard key or any other input. In one embodiment, a list of predicted next commands may be displayed for viewing by a user. The user may then be able to scroll through the list to choose a desired command. Numerous other ways or presenting predicted next commands are also possible within the scope of the present disclosure.

In one embodiment, commands are prioritized based on a plurality of factors. For example, factors may include actions or information discovered during operations of each of the modules 202-206.

With regard to template commands determined by the template command module 202, each template command may be assigned a priority based on attributes of the template command and/or its location within a command line history. In one embodiment, template commands may be prioritized based on a length of a matching sequence that precedes the template command. For example, if a sequence preceding the template command matches a current sequence length of four that template command may have a higher priority that a template commands that follows a sequence that only matches a current sequence of length three.

In one embodiment, a template command may be prioritized based on how recent the template command is in history. For example, a template commands that is more recent than another template command may have a higher priority.

In one embodiment, a template command may be prioritized based on how frequently commands that are the same or similar to the template command occur within the command line history. For example, if a first template command includes a very frequently used command name and a second template command includes an infrequently used command name, the first template command may be assigned a higher priority.

Priorities may also be based on parameter derivation rules and/or matching parameters, as well as any other factor. For example, a parameter derivation rule that is often used may result in a predicted next command that used the parameter derivation rule to have a higher priority.

In one embodiment, each of the above attributes may be used by the priority module 210 to create an overall priority score. For example, each attribute may result in adding a priority score for a given template command to create a total priority score. Template commands may then be organized according to an overall priority score.

The above factors in prioritizing template commands and/or predicted next commands are exemplary only. One of skill in the art may recognize numerous other factors within the scope of the present disclosure.

Turning now to FIG. 7 a schematic flow chart diagram illustrating one embodiment of a method 700 for predicting a next command in a CLI is shown. In one embodiment, the method 700 is performed by a command prediction module, such as the command prediction module 106 of FIG. 2.

The method 700 includes determining 702 a template command. In one embodiment, determining 702 a template command includes searching a command line history for a current sequence and designating a command following the current sequence as a template command. In one embodiment, the current sequence includes one or more most recent commands. In one embodiment, a template command is stored in a prediction array.

The method 700 includes determining 704 a parameter derivation rule for deriving a parameter in the template command. In one embodiment, the parameter derivation rule is determined 704 according to the method 800 of FIG. 8. In varying embodiments, the parameter derivation rule is stored in a prediction array, a command line history, and/or a lookup table.

The method 700 includes substituting 706 a substitute parameter into the template command according to the parameter derivation rule. The parameter derivation rule may be used with a current prompt as a reference location. In one embodiment, the command created with the parameter substituted into the template command is a predicted next command.

FIG. 8 is a schematic flow chart diagram illustrating one embodiment of a method 800 for determining a parameter derivation rule. In one embodiment, the method 800 is performed by a parameter derivation module 204 of a command prediction module 106.

The method 800 may include locating 802 a parameter value within a template command. In one embodiment, a parameter value is located 802 based on information defining the syntax and/or semantics of a particular command. In one embodiment this information is found in a CLI help file. In one embodiment, the template command is parsed into different portions and one or more portions are identified as parameters. In one embodiment, a command line interpreter may be used to parse a command into separate portions. In one embodiment, a command line interpreter is used to identify a portion of a command as a parameter.

The method 800 may include searching 804 a command line history for a match with a parameter value. In one embodiment, previous commands of the command line history are searched. In one embodiment, outputs of previous commands are searched. In one embodiment, a match within the command line history is located.

The method 800 may include recording 806 a rule that defines the location of the match with respect to the location of the template command. The rule may include one or more offset values and/or delimiters. In one embodiment, the rule is recorded in a prediction array in a location corresponding to a template command and/or a parameter of a template command.

Figure 9:
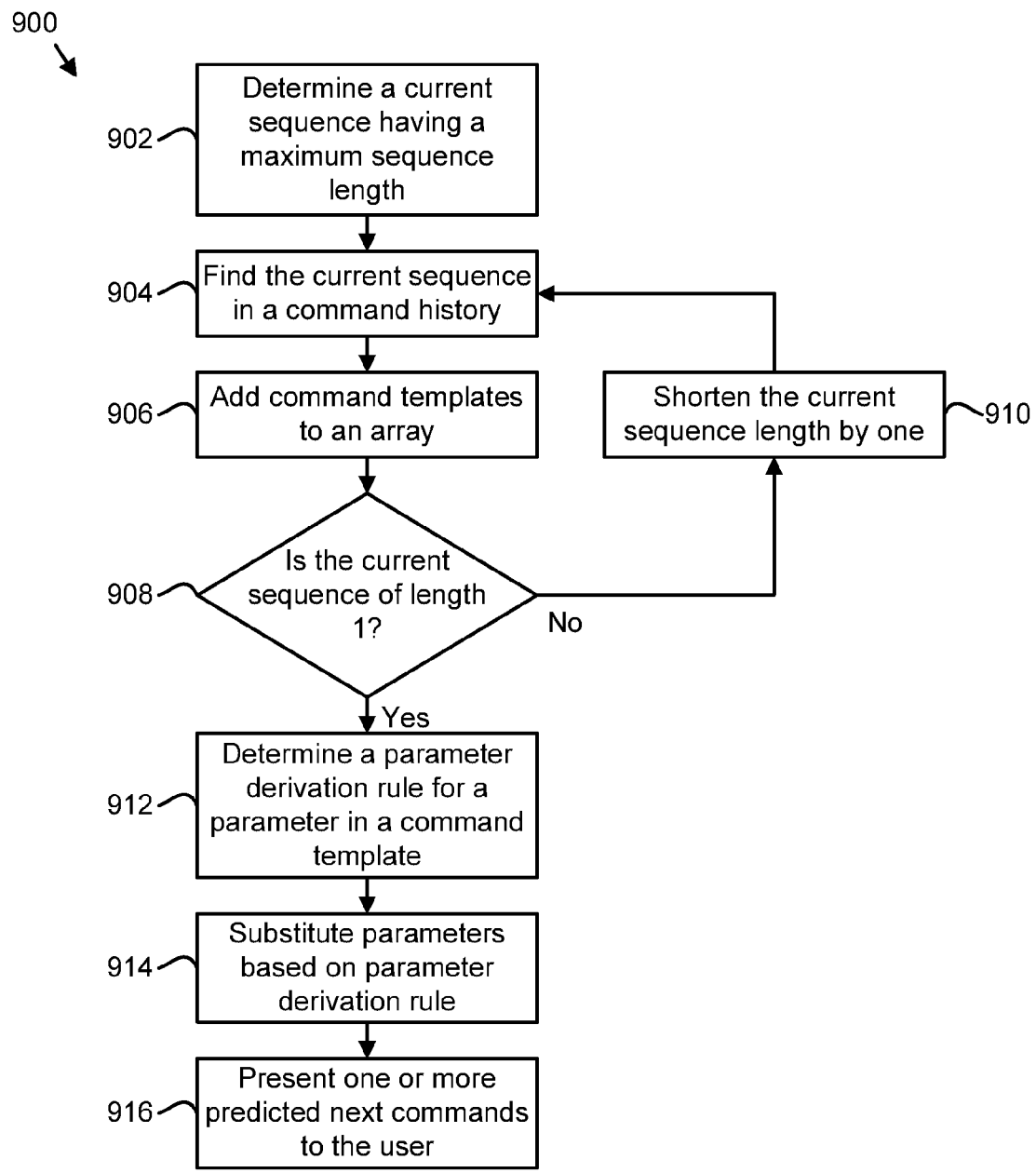
FIG. 9 is a schematic flow chart diagram illustrating one embodiment of a method for predicting a next command in a command line interface in accordance with the present invention.

FIG. 9 is a schematic flow chart diagram illustrating one embodiment of a method 900 for predicting a next command. In one embodiment, the method 900 is performed by a command prediction module 106. The method 900 includes a plurality of steps 902-916 which may not all be included in every embodiments. Some embodiments may include one or more of the steps 902-916 in any combination.

The method 900 may include determining 902 a current sequence having a maximum sequence length. In one embodiment, the maximum sequence length is a customizable value that limits the length of a current sequence. In one embodiment, a current sequence is determined 902 based on one or more most recent commands. For example, if the maximum sequence length was three the current sequence may include the three most recent commands.

The method 900 may include finding 904 the current sequence in a command line history. Finding 904 the current sequence may include searching the command line history for the commands of the current sequence in the command sequence and having the same order. In one embodiment, finding 904 the current sequence may include searching for only a sub portion of the commands of the current sequence. For example, only command names or some other sub portion of a command are searched for.

The method 900 may include adding 906 a template command to a prediction array. In one embodiment, a template command that is added may be a command that immediately follows a match for a current sequence in the command line history. This may be, for example, the match for the current sequence found 904 in the previous step. In one embodiment, a location of the template command is added to the prediction array. In one embodiment, a copy of the template command as it occurs in the command line history may be added to the prediction array. In one embodiment, the length of the matching current sequence preceding the template command may be added to the prediction array.

The method 900 may include determining 908 whether the current sequence is of length 1. If the current sequence is determined 908 to be of length 1, the method may include step which shortens 910 the current sequence by length one. In one embodiment, this includes removing the oldest command from the current sequence to form a current sequence having length shortened 910 by one. Following shortening 910 of the current sequence steps 904-908 may be repeated. In one embodiment steps 904-908 are repeated until the current sequence is determined 908 to be of length one.

The method 900 may include determining 912 a parameter derivation rule for a parameter in a template command. In one embodiment, determining 912 the parameter derivation rule may be performed according to method 800. In one embodiment, determining 912 a parameter derivation rule may include deriving a plurality of parameter derivation rules for one or more template commands. According to one embodiment, parameter derivation rules that have been determined 912 may be stored in a prediction array. In one embodiment, one or more parameter derivation rules may be stored at a location in a prediction array corresponding to a specific template command.

The method 900 may include substituting 914 parameters based on a parameter derivation rule. In one embodiment, a parameter derived from a parameter derivation rule is substituted 914 into a corresponding template command. In one embodiment, a new command created through the substitution 914 is stored in a prediction array. In one embodiment the new command created through the substitution 914 is a predicted next command.

The method 900 may include presenting 916 a predicted next command to a user. In one embodiment, commands created based on one or more of the preceding steps 902-914 may be treated as predicted next commands and presented 916 to the user. In one embodiment, the commands may be presented in list form allowing a user to select a command from the list. In one embodiment, a predicted next command will be displayed at a current prompt. In one embodiment, a predicted next command displayed at a current prompt may be selected by a user using an input device. In one embodiment, a user may cycle through a plurality of predicted next commands using an input device. In one embodiment, a TAB key may be used to select and/or cycle through predicted next commands.

Figure 10:
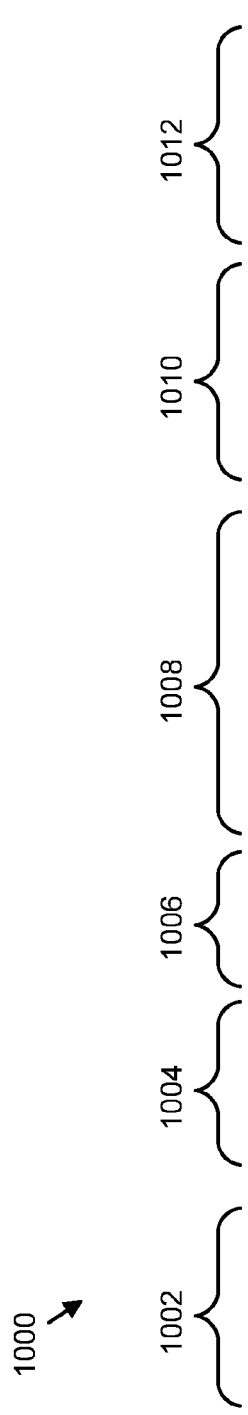
FIG. 10 illustrates an exemplary prediction array in accordance with the present invention.

FIG. 10 depicts a prediction array 1000 according to one embodiment. The exemplary values within the prediction array 1000 reflect the command line history 300 of FIG. 3. In the depicted embodiment, the prediction array 1000 includes a template command column 1002, a sequence match length column 1004, a template location column 1006, a parameter derivation rule column 1008, and a predicted next command column 1010, and a priority score column 1012. Some embodiments may include fewer or additional columns. In one embodiment, the prediction array 1000 includes a plurality of rows. In one embodiment, entries in the same row correspond to the same template command.

The prediction array 1000 may include a template command column 1002. The template command column 1002 may include text of a template command. In one embodiment, when a template command is determined by a template command module 202 the text of the template command is placed in the template commands column 1002.

The prediction array 1000 may include a sequence match length column 1004. The sequence match length column 1004 may include a number indicating the length of matching sequence that precedes a template command to which each row corresponds. For example, the number '2' in the first row may indicate the length of the longest current sequence that returned the template command 'nameE paramW' shown in the template command column 1002 in the first row. In one embodiment, the sequence match length may be a value determined by the template command module 202.

The prediction array 1000 may include a template location column 1006. In one embodiment, the template location column 1006 includes a value indicating the location of a template command within a command line history. For example, the number '3' in the first row may indicate that the template command 'nameE paramW' is located at command 3 of the command line history 300. In one embodiment, the template location may be a value determined by the template command module 202.

The prediction array 1000 may include a parameter derivation rule column 1008. In one embodiment, the parameter derivation rule column 1008 includes a parameter derivation rule for a parameter of a corresponding template command. For example, the data in the first row and parameter derivation rule column 1008 may describe the location of a matching value for 'paramW' of the template command. In one embodiment, the parameter derivation rule may be a rule determined by the parameter derivation module 204.

The prediction array 1000 may include a predicted next command column 1010. The predicted next command column 1010 may include predicted next commands as determined by a command prediction module 106. In one embodiment, the commands in the predicted next command column 1010 are the results of a parameter substitution performed by a parameter substitution module 206. For example, the predicted next command 'nameE paramZ' may have been created when the parameter substitution module 206 substituted 'paramZ' of the command 13 in the command line history 300 of FIG. 3 in for 'paramW' of the template command 'nameE paramW' located at command 3 of the command line history 300. In some embodiments one or more additional operations or steps may make changes to a command to arrive at a predicted next command.

The prediction array 1000 may include a priority score column 1012. In one embodiment, the priority score column includes values that indicate a priority of a predicted next command. For example, the number '3' in the first row of the priority score column 1012 may indicate that the predicted next command 'nameE paramZ' has a priority score of 3. In one embodiment, the priority scores in the priority score column 1012 determine the order or priority with which the predicted next commands will be presented to a user. In one embodiment, the scores in the priority score column 101 may be created based on data within the prediction array 1000. For example, template locations indicating older commands may decrease the priority score while template locations indicating newer commands may increase the priority score. Similarly, multiple entries for the same predicted next command text may result in a higher score. For example, rows two and three of the prediction array 1000 are identical. Because this predicted next command occurs twice within the prediction array 1000 they may have correspondingly higher priority scores.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a non-transitory computer readable storage medium storing computer readable program code executable by the processor, the computer readable program code configured to
   determine a template command based on a command line history, the temple command comprising a command name and a parameter, the command line history comprising a plurality of previously entered commands;
   determine a parameter derivation rule for deriving the parameter in the template command based on the command line history, wherein the computer readable program code determines the parameter derivation rule by: locating a parameter value within the template command; searching the command line history for a match with the parameter; defining the location of the match with respect to the location of the parameter value of the template command; and outputting a previous parameter to the template command; and
   substitute a substitute parameter for the parameter of the template command according to the parameter derivation rule, wherein the substitute parameter is a previously entered parameter from the command line history previously entered with one of the previously entered commands of the plurality of previously entered commands from the command line history, the command line history comprises commands entered at a command prompt in a command line interface, the temple command with the substitute parameter comprises a predicted next command, and the predicted next command is unique from any command in the command line history.

2. The apparatus of claim 1, wherein the command line history further comprises outputs of the plurality of previously entered commands.

3. The apparatus of claim 1, wherein the computer readable program code locates the template command by searching the command line history for a matching sequence that matches a current sequence.

4. The apparatus of claim 3, wherein the template command is a command immediately following the matching sequence.

5. The apparatus of claim 3, wherein searching the command line history for the matching sequence comprises searching for command names of the current sequence independently of command parameters.

6. The apparatus of claim 3, wherein the matching sequences comprises the same command names as the current sequence.

7. The apparatus of claim 3, wherein the current sequences comprises one or more commands that were most recently entered into the command line interface.

8. The apparatus of claim 1, wherein the searching the command line history for a match with the parameter comprises searching one or more of: commands previous to the template command.

9. The apparatus of claim 1, wherein the parameter derivation rule comprises one or more of
   a command offset;
   an line offset;
   a delimiter character; and
   a column offset.

10. The apparatus of claim 1, wherein the predicted next command is comprised in a first predicted next command and wherein the apparatus determines the first predicted next command and a second predicted next command.

11. The apparatus of claim 10, further comprising computer readable program code configured to prioritize the first predicted next command and the second predicted next command.

12. The apparatus of claim 10, wherein the first predicted next command and the second predicted next command are prioritized based on one or more of
   a length of a matching sequence that matches a current sequence;
   a number of occurrences for the matching sequence; and
   how recently the matching sequence occurred.

13. A computer program product for predicting a command in a command line interface, the computer program product comprising:
   a non-transitory computer readable storage medium having computer readable program code embodied therein, the computer readable program code configured to:
   determine a template command based on a command line history, the template command comprising a command name and a parameter, the command line history comprising a plurality of previously entered commands;
   determine a parameter derivation rule for deriving the parameter in the template command based on the command line history, wherein the computer readable program code determines the parameter derivation rule by: locating a parameter value within the template command; searching the command line history for a match with the parameter; defining the location of the match with respect to the location of the parameter value of the temple command; and outputting a previous parameter to the template command; and
   substitute a substitute parameter for the parameter of the template command according to the parameter derivation rule, wherein the substitute parameter is a previously entered parameter from the command line history previously entered with one of the previously entered commands of the plurality of previously entered commands from the command line history, the command line history comprises commands entered at a command prompt in the command line interface, the template command with the substitute parameter comprises a predicted next command and the predicted next command is unique from any command in the command line history.

14. The computer program product of claim 13, wherein the parameter derivation rule comprises one or more of
   a command offset;
   a line offset;
   a delimiter character; and
   a column offset.

15. A computer implemented method comprising:
   processing, by using a computer system, commands entered at a command prompt in a command line interface;
   determining a template command based on a command line history, the template command comprising a command name and a parameter, the command line history comprising a plurality of previously entered commands;

determining a parameter derivation rule for deriving the parameter in the template command based on the command line history;

deriving the parameter derivation rule by: locating a parameter value within the template command; searching the command line history for a match with the parameter; defining the location of the match with respect to the location of the parameter value of the template command; and outputting a precious parameter to the template command; and substituting a substitute parameter for the parameter of the template command according to the parameter derivation rule, wherein the substitute parameter is a previously entered parameter form the command line history preciously entered with one of the preciously entered commands of the plurality of previously entered commands form the command line history, the command line history comprises commands entered at the command prompt in the command line interface, the template command with the substitute parameter comprises a predicted next command, and the predicted next command is unique from any command in the command line history.

\* \* \* \* \*